(12) United States Patent  
Heinrich

(10) Patent No.: US 9,586,693 B1  
(45) Date of Patent: Mar. 7, 2017

(54) EVENT-DRIVEN BURST-MODE STATUS REPORTING

(71) Applicant: Rockwell Collins, Inc., Cedar Rapids, IA (US)

(72) Inventor: Richard E. Heinrich, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 404 days.

(21) Appl. No.: 14/275,316

(22) Filed: May 12, 2014

Related U.S. Application Data

(60) Provisional application No. 61/991,232, filed on May 9, 2014.

(51) Int. Cl.
*G08B 21/00* (2006.01)
*B64D 45/00* (2006.01)
*G06F 1/00* (2006.01)

(52) U.S. Cl.
CPC ............... *B64D 45/00* (2013.01); *G06F 1/00* (2013.01)

(58) Field of Classification Search
CPC .................................... G06F 1/00; H04L 1/00
See application file for complete search history.

(56) References Cited

U.S. PATENT DOCUMENTS

| | | | |
|---|---|---|---|
| 2012/0052870 A1* | 3/2012 | Habicher | H04W 8/16 455/456.1 |
| 2012/0191273 A1* | 7/2012 | Jacobs | H04B 7/18508 701/3 |
| 2014/0143839 A1* | 5/2014 | Ricci | H04W 12/06 726/4 |

* cited by examiner

*Primary Examiner* — Shirley Lu
(74) *Attorney, Agent, or Firm* — Angel N. Gerdzhikov; Donna P. Suchy; Daniel M. Barbieri

(57) ABSTRACT

The present disclosure is directed to an event-driven reporting system that enables off-board entities, such as on-ground control centers or other aircrafts, to receive information regarding on-board conditions when the aircraft enters into a non-nominal or hostile state. Various embodiments of the disclosure are directed to an event-driven reporting system and method that provide a burst-mode transmission of recorded on-board data to an off-board entity when certain triggering events that indicate non-nominal or hostile aircraft conditions are detected.

20 Claims, 2 Drawing Sheets

EVENT-DRIVEN BURST-MODE STATUS REPORTING

PRIORITY

The present application claims priority under 35 U.S.C. §119(e) to U.S. Provisional Patent Application Ser. No. 61/991,232, titled EVENT-DRIVEN BURST-MODE STATUS REPORTING, By Richard E. Heinrich, filed May 9, 2014, or is an application of which currently co-pending application(s) are entitled to the benefit of the filing date. The above-referenced provisional patent application is hereby incorporated by reference in its entirety.

FIELD OF INVENTION

The present disclosure relates to aircraft monitoring, and more particularly, to a system and method for event-driven transmission of informative data from on-board recording devices in the face of non-nominal or hostile aircraft conditions.

BACKGROUND

Under "nominal" conditions (i.e., when all systems are properly functioning), an in-flight aircraft is capable of communicating with off-board entities, such as on-ground control centers (e.g., air traffic control) or other aircrafts. However, when the aircraft experiences equipment failures, malfunctioning systems, or intentionally disabled or overridden systems, the aircraft enters into a "non-nominal" state, or the aircraft may be in a "hostile" state if equipment is maliciously disabled/accessed by an unauthorized user. Communication may be compromised during non-nominal or hostile conditions due to equipment failure or malicious interference. Depending upon the circumstances, recovery of the aircraft may become impossible or very difficult.

Currently, many aircrafts are equipped with recording devices to maintain a record of on-board audio/video, flight data (e.g., equipment statuses, travel logs), and the like. For example, on-board recording devices may include, but are not limited to, cockpit voice recorders (CVRs) and flight data recorders (FDRs). One problem is that if the aircraft is never recovered, the on-board recording devices cannot be used to determine why the aircraft went off-course or crashed. Moreover, current systems only provide data regarding the situation on-board the aircraft after the fact, that is, after the non-nominal or hostile situation has fully materialized. In view of the deficiencies outlined above, it is clear that a great need exists in the art for a method of obtaining aircraft information from an aircraft experiencing non-nominal or hostile conditions prior to the time of search and recovery.

SUMMARY

The present disclosure is directed to a system and method for event-driven reporting to enable off-board entities, such as on-ground control centers or other aircrafts, to receive information regarding on-board conditions when an aircraft enters into a non-nominal or hostile state. Some embodiments of the disclosure include an event-driven reporting system for an aircraft. The event-driven reporting system may include an internal power supply, a transmitter, and an information retrieval system coupled with the transmitter. The information retrieval system may be configured to collect data from one or more on-board recording devices and may be enabled to transmit data collected prior to and/or during a non-nominal or hostile condition (i.e., prior to a triggering event). Burst-mode transmission of the on-board data may be driven by a controller in communication with an event monitor. When the event monitor detects a change in the operating state of at least one aircraft communication, tracking, or flight control system that indicates a non-nominal or hostile condition, the controller is configured to initiate bust-mode transmission of the on-board data collected from the on-board recording devices to an on-ground control center, another aircraft, or any other off-board entity.

Upon receiving a data dump of information from the one or more on-board recording devices, the off-board entity is enabled to assess the situation on-board the aircraft and determine appropriate responsive action. For example, some non-nominal conditions may be repairable, temporary, or non-threatening, while others may be catastrophic and may call for on-ground precautions. In hostile situations, such as hijackings, it may be useful to determine whether on-board conditions are chaotic indicating that the aircraft may crash or whether the aircraft is likely to make an unauthorized landing. By enabling off-board entities to receive information indicative of why or how a non-nominal or hostile situation is unfolding, responsive actions can be greatly improved.

It is to be understood that both the foregoing general description and the following detailed description are not necessarily restrictive of the disclosure. The accompanying drawings, which are incorporated in and constitute a part of the specification, illustrate embodiments of the disclosure, wherein like numbers represent like elements or features.

BRIEF DESCRIPTION OF THE DRAWINGS

The embodiments of the disclosure may be better understood by those skilled in the art by reference to the accompanying figures in which.

DETAILED DESCRIPTION

Figure 1:
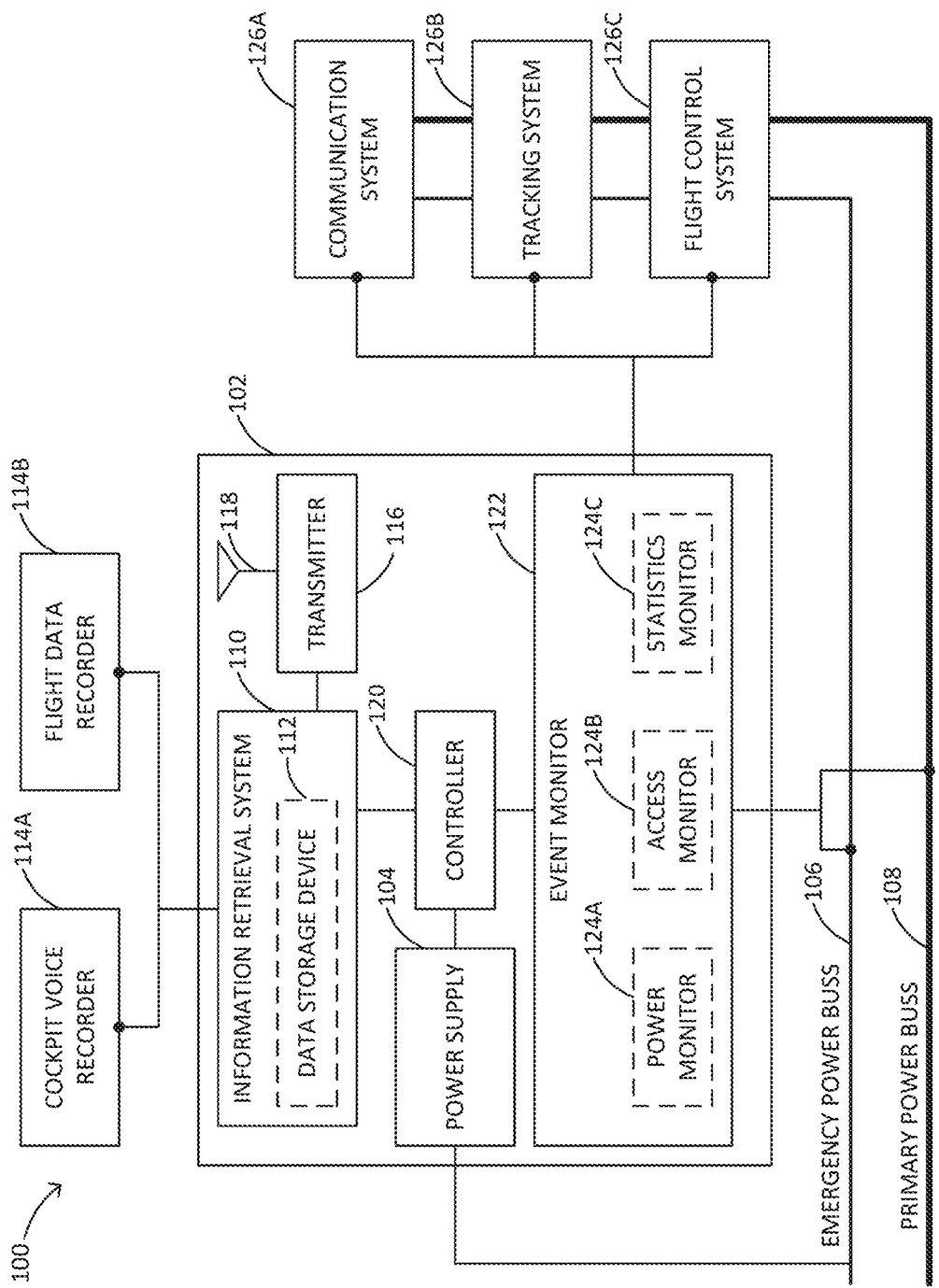
FIG. 1 is a block diagram illustrating an event-driven reporting system, in accordance with an embodiment of the disclosure.
Figure 2:
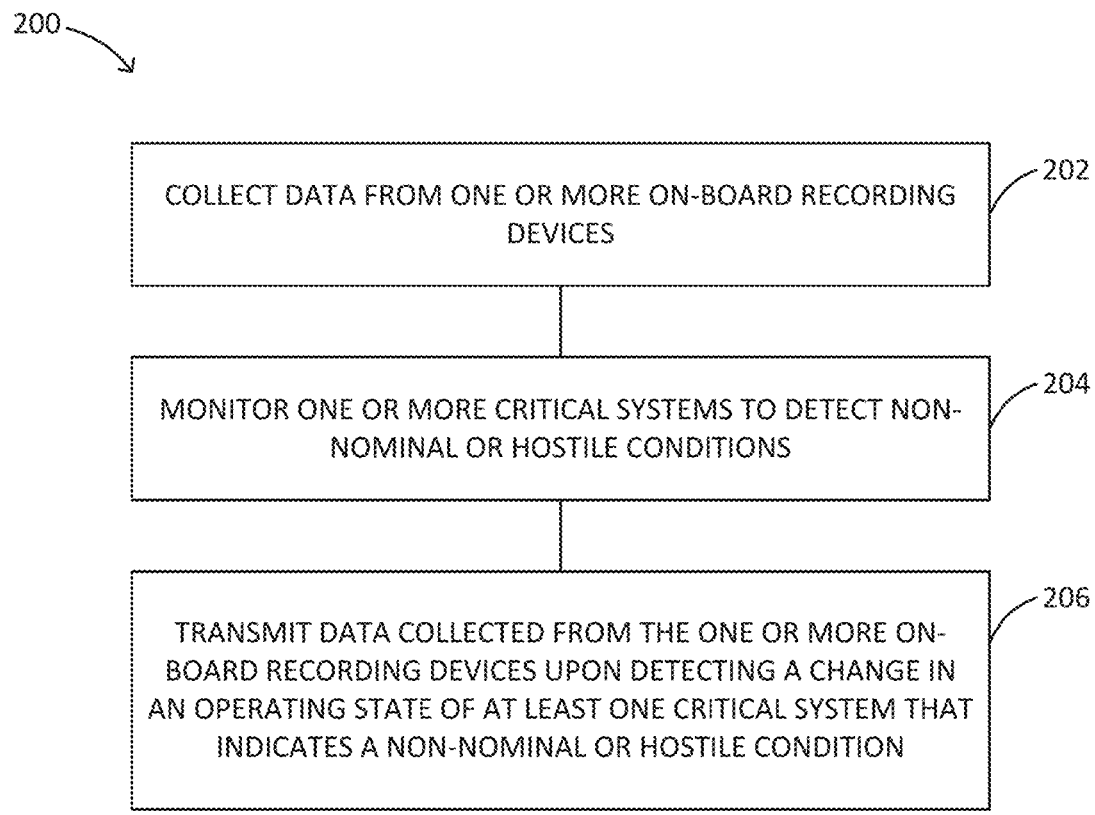
FIG. 2 is a flow diagram illustrating a method for event-driven reporting, in accordance with an embodiment of the disclosure.

Reference will now be made in detail to the embodiments disclosed, which are illustrated in the accompanying drawings. FIGS. 1 and 2 generally illustrate a system and method for event-driven reporting to enable off-board entities, such as on-ground control centers (e.g., air traffic control) or other aircrafts, to receive information regarding on-board conditions when an aircraft enters into a non-nominal or hostile state. For example, a non-nominal condition may include, but is not limited to, failure or intentional deactivation of aircraft tracking, communication, or control systems. In some instances, equipment may lose power or malfunction due to faulty components or unintentional/accidental events. In other cases, equipment may be intentionally disabled to control an unexpected threat (e.g., fire on the deck) or to prevent further damage to failing equipment. A hostile condition may include, but is not limited to, deactivated, damaged, and/or unauthorized access to aircraft equipment by a malicious actor on-board the aircraft. In general, non-nominal or hostile conditions may include any scenario where critical systems, such as communication, tracking, or control systems on-board the aircraft are compromised.

Embodiments of event-driven reporting systems and methods described herein can assist in responding to non-nominal or hostile aircraft conditions and/or recovering an aircraft that ultimately crashes or makes an unauthorized landing.

During non-nominal conditions and, even more so, during hostile conditions, information regarding the environment on-board an aircraft is of great importance. However, during such conditions, aircraft communication systems may become compromised due to equipment failure or malicious interference, and information from an on-board recording device (e.g., CVR or FDR) can only be obtained if and when the aircraft is recovered. This makes it difficult (if not impossible) to take any responsive actions and can result in a total lack of information as to how or why an aircraft went off-course if a missing aircraft is never located. FIG. 1 illustrates an event-driven reporting system 100 configured to provide a burst-mode transmission of data recorded, at least over specified time period, prior to a "triggering" event indicative of a non-nominal or hostile condition on-board the aircraft. Accordingly, an off-board entity receiving the recorded data can assess the situation on-board the aircraft and/or may have a clue of how or why the aircraft went off-course.

As shown in FIG. 1, the event-driven reporting system 100 may include an enclosure 102 housing an internal power supply 104, such as battery, and may further include one or more connections to external power sources, such as an emergency power buss 106 and/or a primary power buss 108 of an aircraft. In some embodiments, the enclosure 102 may be formed from a material resistant to fire, electrostatic shock, high impacts, and may be hermetically sealed. For example, the enclosure 102 may include a casing similar to that used for a flight data recorder (FDR) or a cockpit voice recorder (CVR) (i.e., the "black box" on-board an aircraft). The internal power supply 104 may be enabled when external power is lost.

The system 100 may further include an information retrieval system 110, which may include at least one processor or storage controller in communication with a data storage device 112. The information retrieval system 110 may be connected to one or more on-board recording devices 114 such as, but not limited to, a CVR 114A and/or an FDR 114B. In some embodiments, the information retrieval system 110 is configured to download recorded data from the one or more on-board recording devices 114 when activated due to a triggering event. In other embodiments, the information retrieval system 110 is configured to maintain a cache of data collected from the one or more on-board recording devices 114. For example, the information retrieval system 110 may be configured to continuously or periodically download data from the one or more on-board recording devices 114 to keep a cache of recent data in the data storage device 112. This cache may be limited by storage capacity of the data storage device 112 and/or may be limited to a selected period of time prior to the triggering event (e.g., last 30 minutes or last hour leading up to the triggering event).

The information retrieval system 110 may be coupled with a transmitter 116 configured to transmit, wirelessly via a respective antenna 118, a burst-mode dump of data collected from the one or more on-board recording devices 114. In some embodiments, the transmitter 116 is configured to send the burst-mode dump of the recorded data in a compressed data format over an encrypted or an unencrypted communication channel. A controller 120 may be configured to initiate the burst-mode transmission of the recorded data in response to one or more triggering events. The triggering events may be detected by an event monitor 122 that is in communication with the controller 120. In some embodiments, the event monitor 122 is at least partially contained within the enclosure 102. Alternatively, the event monitor 122 is externally located and connected to the controller 120 via a wired or close-proximity (e.g., NFC) communication link. In embodiments where the event monitor 122 is externally located, a triggering event may include a loss of connection between the controller 120 and the event monitor 122.

In some embodiments, as long as the information retrieval system 110 is not disabled, the information retrieval system 110 may be configured to continue pulling or receiving data from the on-board recording devices 114 after the triggering event has occurred for streaming or periodic burst-mode transmission to an off-board entity. At a minimum, an off-board entity is provided with a one-time dump of recorded data that is indicative of the on-board environment leading up to a triggering event, and in some cases, the off-board entity is provided with continued streaming or periodic burst-mode transmissions of information that may provide the off-board entity with further detail of how the non-nominal or hostile aircraft condition is unfolding.

The event monitor 122 may include one or more sensors 124 for detecting various triggering events, such as a change in an equipment operating state. For example, the event monitor 122 may include a power monitor 124A, such as an electrical current or voltage detector, configured to detect interruptions (i.e., loss of power) in the aircraft power busses 106/108 and/or power lines extending from the power busses 106/108 to critical systems 126, such as a communication system 126A, a tracking system 126B, or a flight control system 126C of the aircraft. In some embodiments, the critical systems 126 are those connected to the emergency power buss 106. Accordingly, loss of power to one or more of the critical systems 126 may be detected by simply monitoring the emergency buss 106. The controller 120 may be configured to initiate transmission of the recorded data in response to detection of a loss of power to a critical system 126. For example, the controller 120 may be configured to initiate transmission of the recorded data when the power monitor 124A detects a failure of the emergency power buss 106 or a failed/disabled connection to a critical system 126 from the emergency power buss 106. The controller 120 may be further configured to initiate transmission of the recorded data in response to detection of a loss of externally supplied power to the reporting system 100 (e.g., in the event of malicious disconnection from the external power source) or in response to a request to power down the reporting system 100 or an attempted forced shutdown.

The event monitor 122 may include additional or alternative sensors 124 for detecting changed operating states of critical systems 126 on-board the aircraft. For example, in some embodiments, the event monitor 122 may include an access monitor 124B, such as a physical force sensor, configured to detect unauthorized access to a secured panel of at least one critical system 126 or attempts to access or disconnect the system 100 from the one or more on-board recording devices 114. In other exemplary embodiments, the event monitor 122 may include an in-fight statistics monitor 124C configured to detect an equipment failure (e.g., loss of functionality) or defective operation (e.g., deviation from expected operation or breached threshold) of at least one critical system 126. The controller 120 may be configured to initiate burst-mode transmission of the recorded data according to specific events, which may be specific to one or more of the critical systems 126. For example, triggering events may be limited to a change in operating state of the one or more communication systems 126A on-board the aircraft, such as disabled or prevented communications with ground that could indicate a hostile condition. The recorded data may be particularly valuable to an off-board entity when communication is cut off. In some embodiments, a triggering event may depend upon detecting changed states of a specified combination of the critical systems 126 (e.g., failure of at least a first critical system and a second critical system).

In accordance with the foregoing embodiments of the event-driven reporting system 100, recorded data that is indicative of on-board conditions can be provided to an off-board entity during non-nominal or hostile conditions. This advantageously provides the off-board entity with current view or snapshot of aircraft operating conditions. For example, in the case of the CVR 114A where data is collected periodically and written over after a period of time, the event would capture and burst the current and/or recent flight deck conversations, sounds, etc. This would provide the off-board entity with a snapshot of the current on-board conditions, for example, arguing, screaming, hostile conversations, the step by step actions of a malicious person on-board the aircraft, etc. Similarly, the FDR 114B may dump its current and/or recent state which would likely capture what systems were being disabled, accessed by unauthorized users, or deviations from expected in-flight statistics. Accordingly, an off-board entity is enabled to assess the situation on-board the aircraft and determine appropriate responsive action. For example, some non-nominal conditions may be repairable, temporary, or non-threatening while others may be catastrophic and may call for ground precautions. In hostile situations, such as hijackings, it may be useful to determine whether on-board conditions are chaotic indicating that the aircraft may crash or whether the aircraft is likely to make an unauthorized landing. By enabling off-board entities to receive information of why or how a non-nominal or hostile situation is unfolding, responsive actions can be greatly improved.

In some embodiments, the event-driven reporting system 100 may share a common event monitor 122 with an event-driven transponder. Event-driven transponders and triggering events are discussed in co-pending U.S. patent application Ser. No. 61/991,220, titled ARCHITECTURE INDEPENDENT EVENT DRIVEN TRANSPONDERS AND POSITION REPORTING DEVICES, by Richard E. Heinrich et al, which is incorporated by reference in its entirety. In some embodiments, different triggering events are set for the transmission of an event-driven tracking signal and for the burst-mode transmission of recorded data. For example, it may be desirable to transmit recorded on-board data for triggering events concerning any of the critical systems 126, while the triggering events established for transmission of a secondary tracking signal may include events that are more closely related to the one or more primary tracking systems 126B on-board the aircraft.

Those skilled in the art will appreciate that any number of triggering events may be established for event-driven reporting or tracking systems without departing from the scope of this disclosure. Further, those skilled in the art will appreciate that the system 100 may be deployed in a vehicle other than an aircraft. Accordingly, the any discussion herein that relates to an "aircraft" may be applicable to any air, ground, or water vehicle, including manned or unmanned aerial, terrestrial, space, aquatic, and/or submarine vehicles.

FIG. 2 illustrates a method 200 of burst-mode event-driven reporting, which may be manifested by system 100.

However, method 200 is not restricted to the embodiments of system 100 described above. The method 200 may be manifested by any system configured to perform the following steps.

At step 202, data is collected from one or more on-board recording devices 114. In some embodiments, the data is continuously or periodically downloaded to a storage device 112. Alternatively, data from the one or more on-board recording devices 114 may be requested when a triggering event is detected. To account for possible disconnection from an on-board recording device 114, however, it may be preferable to maintain a cache of continuously or periodically updated data.

At step 204, one or more critical systems 126 on-board the aircraft may be monitored to detect triggering events that are indicative of non-nominal or hostile conditions. For example, triggering events may include, but are not limited to: loss of power to a critical system 126; loss of external power to the reporting system 100; unauthorized access or attempts to disable/shutdown a critical system 126 or the reporting system 100; disconnection from a critical system 126 or an on-board recording device 114; or deviations from nominal in-flight statistics.

At step 206, upon detecting a triggering event, previously cached and/or instantly requested data from the one or more on-board recording devices 114 is transmitted via an internal transmitter 116 or an available communication link to an off-board entity. In some embodiments, this transmission is a one-time dump of the previously cached and/or instantly requested data. In further embodiments, data continues to be streamed or periodically dumped after the triggering event (if possible) to provide an off-board entity with additional information regarding the on-board aircraft conditions.

It should be recognized that the various functions, operations, or steps described throughout the present disclosure may be carried out by any combination of hardware, software, or firmware. In some embodiments, various steps or functions are carried out by one or more of the following: electronic circuitry, logic gates, multiplexers, a programmable logic device, an application-specific integrated circuit (ASIC), a controller/microcontroller, or a computing system. A computing system may include, but is not limited to, a personal computing system, mainframe computing system, workstation, image computer, parallel processor, or any other device known in the art. In general, the terms "controller" and "computing system" are broadly defined to encompass any device having one or more processors, which execute instructions from a carrier medium.

Program instructions implementing methods, such as those manifested by embodiments described herein, may be transmitted over or stored on carrier medium. The carrier medium may be a transmission medium, such as, but not limited to, a wire, cable, or wireless transmission link. The carrier medium may also include a non-transitory signal bearing medium or storage medium such as, but not limited to, a read-only memory, a random access memory, a magnetic or optical disk, a solid-state or flash memory device, or a magnetic tape.

It is further contemplated that any embodiment of the disclosure manifested above as a system or method may include at least a portion of any other embodiment described herein. Those having skill in the art will appreciate that there are various embodiments by which systems and methods described herein can be implemented, and that the implementation will vary with the context in which an embodiment of the disclosure is deployed. Furthermore, it is to be understood that the invention is defined by the appended claims. Although embodiments of this invention have been illustrated, it is apparent that various modifications may be made by those skilled in the art without departing from the scope and spirit of the disclosure.

What is claimed is:

1. An event-driven reporting system, comprising:
   an internal power supply;
   a transmitter;
   an information retrieval system coupled with the transmitter, the information retrieval system being configured to collect data from one or more on-board recording devices;
   an event monitor configured to detect a change in an operating state of at least one aircraft communication, tracking, or flight control system; and
   a controller in communication with the event monitor, the controller being configured to initiate transmission of a burst-mode data dump containing the data collected from the one or more on-board recording devices, via the transmitter, when the event monitor detects the change in the operating state of the at least one aircraft communication, tracking, or flight control system.

2. The event-driven reporting system of claim 1, wherein the event monitor includes a power monitor configured to detect a loss of power to the at least one aircraft communication, tracking, or flight control system.

3. The event-driven reporting system of claim 1, wherein the event monitor includes an access monitor configured to detect unauthorized access to the at least one aircraft communication, tracking, or flight control system.

4. The event-driven reporting system of claim 1, wherein the event monitor includes an in-flight statistics monitor configured to detect a failed or defective operating state of the at least one aircraft communication, tracking, or flight control system.

5. The event-driven reporting system of claim 1, further comprising a connection to an external power supply.

6. The event-driven reporting system of claim 5, wherein the event monitor is further configured to detect a loss of power from the external power supply, and the controller is further configured to initiate transmission of the at least a portion of the data collected from the one or more on-board recording devices, via the transmitter, when the event monitor detects a loss of power from the external power supply.

7. The event-driven reporting system of claim 1, wherein the one or more on-board recording devices include at least one of a cockpit voice recorder or a flight data recorder.

8. The event-driven reporting system of claim 1, wherein the information retrieval system includes a data storage device configured to store the data collected from the one or more on-board recording devices over a selected period of time, and the controller is configured to initiate a one-time burst-mode data dump of at least a portion of the data collected from the one or more on-board recording devices over the selected period of time in a compressed format, via the transmitter, when the event monitor detects the change in the operating state of the at least one aircraft communication, tracking, or flight control system.

9. A method of event-driven reporting, comprising:
   collecting data from one or more on-board recording devices;
   detecting a change in an operating state of at least one aircraft communication, tracking, or flight control system; and
   triggering a burst-mode data dump that contains the data collected from the one or more on-board recording devices in response to detecting the change in the operating state of the at least one aircraft communication, tracking, or flight control system.

10. The method of claim 9, wherein detecting a change in an operating state of at least one aircraft communication, tracking, or flight control system includes:
    detecting a loss of power to the at least one aircraft communication, tracking, or flight control system.

11. The method of claim 9, wherein detecting a change in an operating state of at least one aircraft communication, tracking, or flight control system includes:
    detecting unauthorized access to the at least one aircraft communication, tracking, or flight control system.

12. The method of claim 9, wherein detecting a change in an operating state of at least one aircraft communication, tracking, or flight control system includes:
    detecting a failed or defective operating state of the at least one aircraft communication, tracking, or flight control system.

13. The method of claim 9, wherein detecting a change in an operating state of at least one aircraft communication, tracking, or flight control system includes:
    detecting a loss of power from an external power supply.

14. The method of claim 9, wherein the one or more on-board recording devices include at least one of a cockpit voice recorder or a flight data recorder.

15. The method of claim 9, further comprising:
    storing the data collected from the one or more on-board recording devices over a selected period of time in a data storage device external to the one or more on-board recording devices; and
    triggering a one-time burst-mode data dump of at least a portion of the data collected from the one or more on-board recording devices over the selected period of time in a compressed format, via the transmitter, when the event monitor detects the change in the operating state of the at least one aircraft communication, tracking, or flight control system.

16. A non-transitory signal bearing medium with program instructions stored thereon, the program instructions comprising one or more instruction sets configured to cause a processor to:
    request data from one or more on-board recording devices;
    store the data requested from the one or more on-board recording devices on a data storage device;
    receive a triggering signal in response to a change in an operating state of at least one aircraft communication, tracking, or flight control system; and
    transmit a burst-mode data dump that contains the data requested from the one or more on-board recording devices, via a transmitter, upon receiving the triggering signal.

17. The non-transitory signal bearing medium of claim 16, wherein the detected change in an operating state of at least one aircraft communication, tracking, or flight control system includes a loss of power to the at least one aircraft communication, tracking, or flight control system.

18. The non-transitory signal bearing medium of claim 16, wherein the detected change in an operating state of at least one aircraft communication, tracking, or flight control system includes unauthorized access to the at least one aircraft communication, tracking, or flight control system.

19. The non-transitory signal bearing medium of claim 16, wherein the detected change in an operating state of at least one aircraft communication, tracking, or flight control system includes a failed or defective operating state of the at least one aircraft communication, tracking, or flight control system.

20. The non-transitory signal bearing medium of claim 16, wherein the detected change in an operating state of at least one aircraft communication, tracking, or flight control system includes a lost connection between the processor and the one or more on-board recording devices.

\* \* \* \* \*